United States Patent
Isozaki

(10) Patent No.: US 11,422,496 B2
(45) Date of Patent: Aug. 23, 2022

(54) IMAGE FORMING APPARATUS

(71) Applicant: CANON KABUSHIKI KAISHA, Tokyo (JP)

(72) Inventor: Shinichi Isozaki, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/466,349

(22) Filed: Sep. 3, 2021

(65) Prior Publication Data
US 2022/0075305 A1 Mar. 10, 2022

(30) Foreign Application Priority Data
Sep. 10, 2020 (JP) .............................. JP2020-152220

(51) Int. Cl.
*G03G 15/00* (2006.01)
*G06T 7/00* (2017.01)

(52) U.S. Cl.
CPC ....... *G03G 15/5041* (2013.01); *G06T 7/0008* (2013.01); *G03G 2215/00037* (2013.01); *G06T 2207/30144* (2013.01)

(58) Field of Classification Search
CPC ..... G03G 15/5041; G03G 2215/00037; G03G 15/5062; G06T 7/0008; G06T 2207/30144
See application file for complete search history.

(56) References Cited

U.S. PATENT DOCUMENTS 9,053,360 B2 6/2015 Kawamoto
2013/0136315 A1 5/2013 Kawamoto
2019/0033765 A1* 1/2019 Haga ................. H04N 1/00015

FOREIGN PATENT DOCUMENTS

JP 2013-132042 A 7/2013

* cited by examiner

*Primary Examiner* — Susan S Lee
(74) *Attorney, Agent, or Firm* — Venable LLP

(57) ABSTRACT

An image forming apparatus includes: an image forming unit configured to form an image on a sheet; a line sensor configured to read a sheet having test images formed thereon while the sheet having the test images formed thereon is conveyed; and a controller configured to: control the image forming unit to form the test images on the sheet; control the line sensor to read the sheet having the test images formed thereon; obtain read data related to the test images, the read data being output by the line sensor; and control, based on the read data, a geometric characteristic of an image to be formed on a sheet by the image forming unit, wherein the controller is configured to determine, in a reading area of the line sensor, whether dust is detected in a first area.

16 Claims, 7 Drawing Sheets

Figure 1:
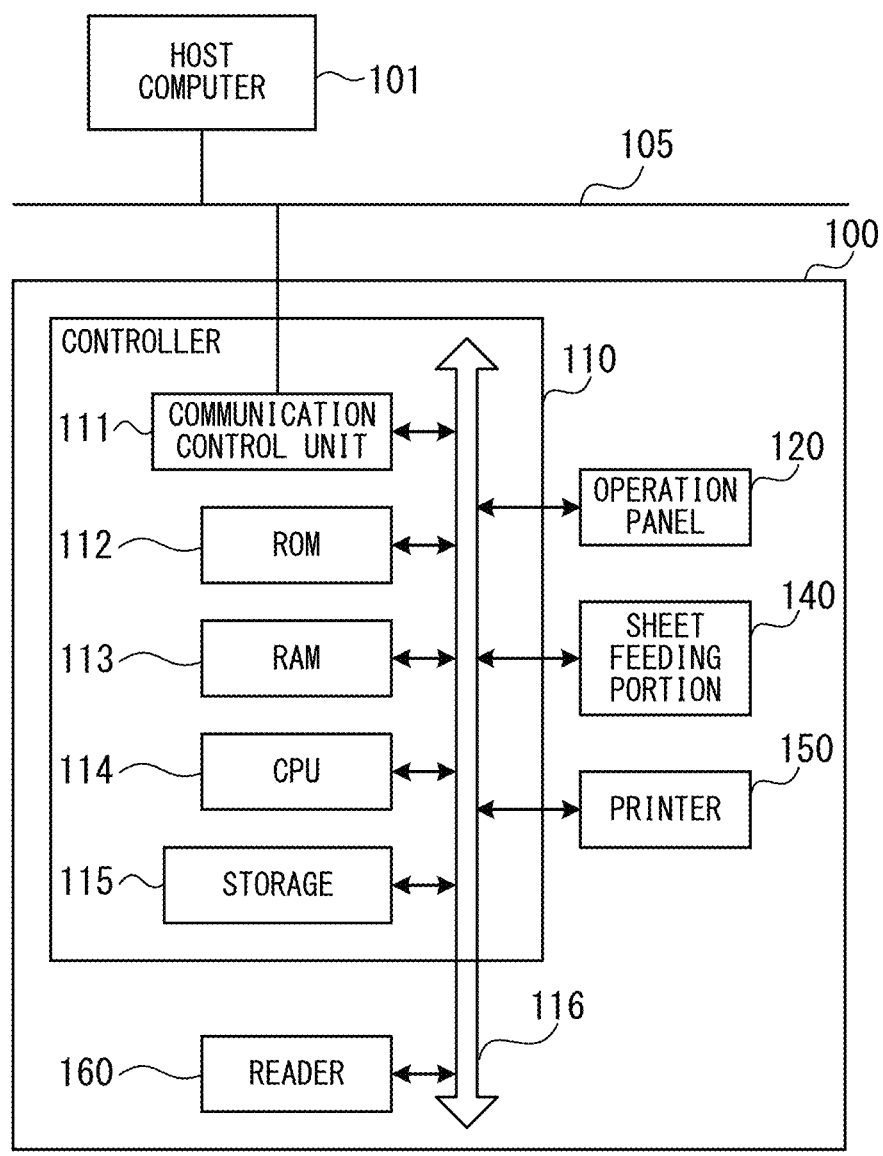

IMAGE FORMING APPARATUS

BACKGROUND OF THE INVENTION

Field of the Invention

The present disclosure relates to an image forming apparatus including line sensors configured to read a sheet having formed thereon test images for adjusting an image forming condition.

Description of the Related Art

An image forming apparatus using an electrophotographic process is configured to form an image on a sheet by processes of charging, exposing, developing, transferring, and fixing, to thereby generate a printed material. A toner image formed through the processes of charging, exposing, and developing is transferred onto a sheet by the transferring process, and is fixed on the sheet by the fixing process. In the image forming apparatus, quality of the printed material may be changed with changes in characteristics of the processes, which are caused by changes with time of parts and environmental changes.

There has been proposed a technology for preventing change in quality of the printed material based on an image read with the use of an image reading apparatus configured to read an image formed on a printed material. For example, there is known a technology in which the read image is compared with a correct image prepared in advance, and printed materials of low quality that do not satisfy a criterion are removed, to thereby output only high-quality printed materials and keep quality of the printed materials. There is also known a technology in which parameters relating to the quality of the printed material, for example, an image density and color misregistration of the printed material, are extracted from the read image, and an image forming condition is adjusted based on the parameters to maintain quality of the printed material.

In the image reading apparatus, an optical sensor, for example, a contact image sensor (CIS) is used. A plate-like glass called a contact glass is provided between the optical sensor and the printed material. The contact glass plays the role of maintaining a distance between the optical sensor and the printed material to be constant. When a foreign matter adheres to the contact glass, noise is generated in the read image, and hence there is a fear that the above-mentioned processing for maintaining the quality of the printed material cannot be performed correctly. For example, when the noise is generated in the read image, the image forming condition is not adjusted correctly, and it becomes difficult to maintain the grade of the printed material.

To address the above-mentioned problem, in U.S. Pat. No. 9,053,360 B2, there is disclosed an apparatus with which, when a foreign matter is detected on a contact glass, a notification for prompting for cleaning is issued to a user. In this apparatus, a detection position of the foreign matter is determined, and a more limiting instruction on a cleaning position is issued, to thereby increase usability.

The cleaning performed in a case where a foreign matter is detected is performed while interrupting the processing of reading an image printed on a printed material by the image reading apparatus. This causes a reduction in productivity and a troublesome work of cleaning by the user. In view of the above-mentioned circumstances, it is a main object of the present disclosure to provide an image reading apparatus with which a reduction in productivity and a troublesome work of cleaning by a user at the time of detection of a foreign matter are suppressed as much as possible.

SUMMARY OF THE INVENTION

An image forming apparatus according to the present disclosure including: an image forming unit configured to form an image on a sheet; a line sensor configured to read a sheet having test images formed thereon while the sheet having the test images formed thereon is conveyed; and a controller configured to: control the image forming unit to form the test images on the sheet; control the line sensor to read the sheet having the test images formed thereon; obtain read data related to the test images, the read data being output by the line sensor; and control, based on the read data, a geometric characteristic of an image to be formed on a sheet by the image forming unit, wherein the controller is configured to determine, in a reading area of the line sensor, whether dust is detected in a first area in which the line sensor reads the test images based on a reading result from the line sensor, wherein, in a case where dust is detected in a second area, which is different from the first area, in the reading area, the controller is configured to control the geometric characteristic based on the read data, and wherein, in a case where dust is detected in the first area, the controller is configured to not control the geometric characteristic based on the read data.

Further features of the present invention will become apparent from the following description of exemplary embodiments (with reference to the attached drawings).

BRIEF DESCRIPTION OF THE DRAWINGS

FIG. 1 is an explanatory diagram of a configuration of a printing system.

FIG. 2 is a view of a configuration of an image forming apparatus.

FIG. 3 is an explanatory diagram of a configuration of a reader.

FIG. 4 is an explanatory diagram of a configuration of a reading unit.

FIG. 5 is an enlarged view of a reading unit part of the reader.

FIG. 6 is a flow chart for illustrating foreign matter determination processing.

FIG. 7 is an explanatory view of foreign matter determination to be performed when image density adjustment is performed.

FIG. 8 is an explanatory view of foreign matter determination to be performed when color misregistration adjustment is performed.

FIG. 9 is an explanatory view of foreign matter determination to be performed when a voltage of transfer rollers is adjusted.

DESCRIPTION OF THE EMBODIMENTS

An embodiment of the present disclosure is described with reference to the drawings.

<Printing System>

FIG. 1 is an explanatory diagram of a configuration of a printing system including an image forming apparatus according to this embodiment. The printing system includes an image forming apparatus 100 and a host computer 101. The image forming apparatus 100 and the host computer 101 are communicably connected through a network 105. The network 105 is a communication line, for example, a local area network (LAN), a wide area network (WAN), or a public communication line. A plurality of the image forming apparatus 100 and a plurality of the host computers 101 may be connected to the network 105.

The host computer 101 is, for example, a server apparatus, and transmits a print job to the image forming apparatus 100 through the network 105. A print job includes various kinds of information required for printing, such as image data, the type of the sheet to be used in printing, the number of sheets to be printed, and an instruction to perform double-sided printing or single-sided printing.

The image forming apparatus 100 includes a controller 110, an operation panel 120, a sheet feeding portion 140, a printer 150, and a reader 160. The image forming apparatus 100 controls an operation of the printer 150 based on the print job obtained from the host computer 101 to form an image based on the image data on a sheet. The controller 110, the operation panel 120, the sheet feeding portion 140, the printer 150, and the reader 160 are connected to be communicable to/from one another through a system bus 116.

The controller 110 controls operations of respective units of the image forming apparatus 100. The controller 110 is an information processing device including a read only memory (ROM) 112, a random access memory (RAM) 113, and a central processing unit (CPU) 114. The controller 110 includes a communication control unit 111, and a storage 115. Modules of the controller 110 are connected to be communicable to/from one another through the system bus 116.

The communication control unit 111 is a communication interface for controlling communication to/from the host computer 101 and other devices through the network 105. The storage 115 is a mass storage device formed of, for example, a hard disk drive (HDD) or a solid state drive (SSD). The storage 115 stores a computer program and various kinds of data used in image forming processing (print processing). The CPU 114 executes a computer program stored in the ROM 112 or the storage 115 to control the operation of the image forming apparatus 100. The RAM 113 provides a work area used by the CPU 114 in executing the computer program.

The operation panel 120 is a user interface, and includes an input interface and an output interface. The input interface includes, for example, operation buttons, numeric keys, or a touch panel. The output interface includes, for example, a liquid crystal display (LCD) or other display devices, or a loudspeaker. A user can input a print job, a command, and print settings, for example, to the image forming apparatus 100 through the operation panel 120. The operation panel 120 displays, under control of the controller 110, a setting screen, the status of the image forming apparatus 100, and a notification of cleaning to the user at the time of detection of a foreign matter, which is to be described later, on the display device.

The sheet feeding portion 140 includes a plurality of sheet feeding stages for containing sheet(s), which are to be described later. The sheet feeding portion 140 feeds a sheet of the type specified in the print job from a sheet feeding stage containing the sheet. The sheet feeding stage contains a plurality of sheets (sheet bundle), which are fed in order from a sheet at the top. The sheet feeding portion 140 conveys the sheet fed from the sheet feeding stage to the printer 150. The respective sheet feeding stages may contain sheets of the same type, or may contain sheets of different types.

The printer 150 prints an image on the sheet fed from the sheet feeding portion 140 based on the image data included in the print job, to thereby generate a printed material. The reader 160 is an image reading apparatus for reading images from the printed material generated by the printer 150, and transmitting a reading result to the controller 110. The images read by the reader 160 are test images for adjusting an image forming condition to be used when the printer 150 forms an image. The controller 110 detects states of the images, for example, image quality, from a result of reading the test images by the reader 160, and adjusts the image forming condition based on the detected states of the images. Here, a description is given of a case in which image densities are detected from the test images, and the image forming condition is adjusted based on the detected image densities.

<Image Forming Apparatus>

Figure 2:
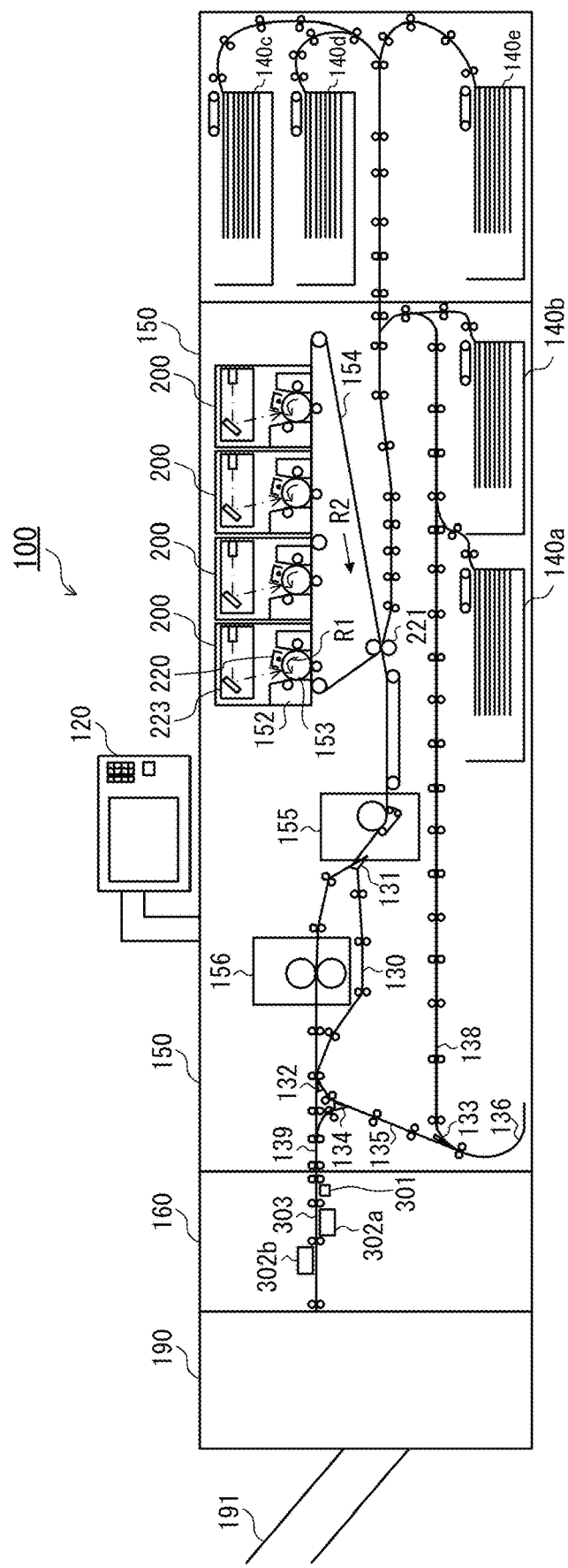

FIG. 2 is a view of a configuration of the image forming apparatus 100. The image forming apparatus 100 includes, in order from an upstream side in a conveying direction of the sheet, sheet feeding stages 140a to 140e, the printer 150, the reader 160, and a finisher 190. The sheet feeding stages 140a to 140e form the sheet feeding portion 140. The finisher 190 is a post-processing apparatus for performing post-processing on the printed material generated by the printer 150. The finisher 190 performs, for example, stapling, sorting, and cutting off areas in which the test images to be described later are formed, on a plurality of printed materials.

The printer 150 includes a plurality of image forming units 200 for forming images of different colors, respectively. The printer 150 in this embodiment includes four image forming units 200 in order to form images of four colors: yellow, magenta, cyan, and black. The image forming units 200 are different only in color of the images to be formed, and perform a similar operation with a similar configuration.

One image forming unit 200 includes a photosensitive drum 153, a charging device 220, an exposure device 223, and a developing device 152. The photosensitive drum 153 is a drum-shaped photosensitive member having a photosensitive layer on a surface thereof, and is driven to rotate in a direction of an arrow R1 by a motor (not shown). The charging device 220 charges the surface (photosensitive layer) of the rotating photosensitive drum 153. The exposure device 223 exposes the charged surface of the photosensitive drum 153 with laser light. The laser light scans the surface of the photosensitive drum 153 in an axial direction of the photosensitive drum 153. The direction in which the laser light scans the surface of the photosensitive drum 153 is a main scanning direction of the printer 150 (depth direction of FIG. 2). As a result, an electrostatic latent image is formed on the surface of the photosensitive drum 153. The developing device 152 develops the electrostatic latent image with the use of a developer (toner). As a result, an image (toner image) obtained by visualizing the electrostatic latent image is formed on the surface of the photosensitive drum 153.

The printer 150 includes an intermediate transfer belt 154 to which toner images generated by the respective image forming units 200 are transferred. The intermediate transfer belt 154 is driven to rotate in a direction of an arrow R2. The toner images of the respective colors are transferred at timings corresponding to the rotation of the intermediate transfer belt 154. As a result, a full-color toner image obtained by superimposing the toner images of the respective colors on one another is formed on the intermediate transfer belt 154. The full-color toner image is conveyed, with the rotation of the intermediate transfer belt 154, to a nip portion (transfer portion) formed by the intermediate transfer belt 154 and transfer rollers 221. The full-color toner image is transferred to the sheet at the nip portion.

The sheet is contained in the sheet feeding stages 140a, 140b, 140c, 140d, and 140e of the sheet feeding portion 140, and are fed in accordance with timings at which the images are formed by the image forming units 200. A sheet feeding stage to feed a sheet is instructed by the print job. The sheet is conveyed to the nip portion at a timing when the full-color toner image is conveyed to the nip portion between the intermediate transfer belt 154 and the transfer rollers 221. As a result, the toner image is transferred at a predetermined position of the sheet. The conveying direction of the sheet is a sub-scanning direction, which is orthogonal to the main scanning direction.

The printer 150 includes a first fixing device 155 and a second fixing device 156, each of which fixes a toner image on the sheet by heating and pressurizing. The first fixing device 155 includes a fixing roller including a heater for heating the sheet, and a pressure belt for bringing the sheet into pressure contact with the fixing roller. The fixing roller and the pressure belt are driven by a motor (not shown) to pinch and convey the sheet. The second fixing device 156 is arranged on a downstream side of the first fixing device in the conveying direction of the sheet. The second fixing device 156 is used to increase gloss and ensure fixability for the image on the sheet that has passed through the first fixing device 155. The second fixing device 156 includes a fixing roller including a heater, and a pressure roller including a heater. Depending on the type of the sheet, the second fixing device 156 is not used. In this case, the sheet is not conveyed to the second fixing device 156, but is conveyed to a conveyance path 130. To that end, on the downstream side of the first fixing device 155, there is provided a flapper 131 for guiding the sheet to any one of the conveyance path 130 and the second fixing device 156.

On the downstream side of a position at which the conveyance path 130 merges on the downstream side of the second fixing device 156, a conveyance path 135 and a discharge path 139 are provided. Therefore, at the position at which the conveyance path 130 merges on the downstream side of the second fixing device 156, there is provided a flapper 132 for guiding the sheet to any one of the conveyance path 135 and the discharge path 139. The flapper 132 guides, for example, in a double-sided printing mode, a sheet having an image formed on a first surface thereof to the conveyance path 135. The flapper 132 guides, for example, in a face-up discharge mode, the sheet having the image formed on the first surface thereof to the discharge path 139. The flapper 132 guides, for example, in a face-down discharge mode, the sheet having the image formed on the first surface thereof to the conveyance path 135.

The sheet conveyed to the conveyance path 135 is conveyed to a reversing portion 136. The sheet conveyed to the reversing portion 136 is switched back in order to reverse the conveying direction after the conveying operation is stopped once. The sheet is guided from the reversing portion 136 to any one of the conveyance path 135 and a conveyance path 138 by a flapper 133. The flapper 133 guides, for example, in the double-sided printing mode, the switched-back sheet to the conveyance path 138 in order to print an image on a second surface. The sheet conveyed to the conveyance path 138 is conveyed toward the nip portion between the intermediate transfer belt 154 and the transfer rollers 221. As a result, front and back sides of the sheet at the time of passing through the nip portion are reversed, and the image is formed on the second surface. The flapper 133 guides, for example, in the face-down discharge mode, the switched-back sheet to the conveyance path 135. The sheet conveyed to the conveyance path 135 by the flapper 133 is guided to the discharge path 139 by a flapper 134.

The sheet (printed material) having the images formed thereon by the printer 150 is conveyed from the discharge path 139 to the reader 160. The reader 160 reads the test images printed on the printed material. The printed material conveyed from the printer 150 to the reader 160 is conveyed along a conveyance path 303 in the reader 160. The reader 160 includes an original detection sensor 301 and reading units 302a and 302b on the conveyance path 303. The reader 160 reads the test images by the reading units 302a and 302b while conveying the printed material along the conveyance path 303. The printed material having the test images printed thereon is described later in detail. In the following description, the printed material having the test images formed thereon is referred to as a "test sheet."

The original detection sensor 301 is, for example, an optical sensor including a light emitting element and a light receiving element. The original detection sensor 301 detects a leading edge in the conveying direction of the printed material conveyed along the conveyance path 303. A result of detecting the leading edge of the printed material by the original detection sensor 301 is transmitted to the controller 110. The controller 110 starts the operation of reading by the reader 160 (reading units 302a and 302b) based on a timing when the leading edge of the printed material is detected by the original detection sensor 301.

The test images can be printed on both sides, that is, the first surface and the second surface, of the printed material. The reading unit 302a and the reading unit 302b are provided across the conveyance path 303 in order to read the test images on both sides of the printed material in one conveyance. The two reading units 302a and 302b are arranged at positions shifted in the conveying direction of the printed material. In this embodiment, the reading unit 302a is arranged on the upstream side, and the reading unit 302b is arranged on the downstream side. When image density adjustment is executed, the image forming apparatus 100 reads the test images by the reading units 302a and 302b, and detects the image densities of the test images on both sides of the printed material from results of the reading. The controller 110 adjusts the image forming condition based on detection results of the image densities to control the image forming processing so that an image to be printed on a printed material has an appropriate density.

The printed material that has passed through the reader 160 is conveyed to the finisher 190. The finisher 190 performs the post-processing on the printed materials, and discharges the printed materials that have been subjected to the post-processing on a discharge tray 191.

<Configuration of Reader>

Figure 3:
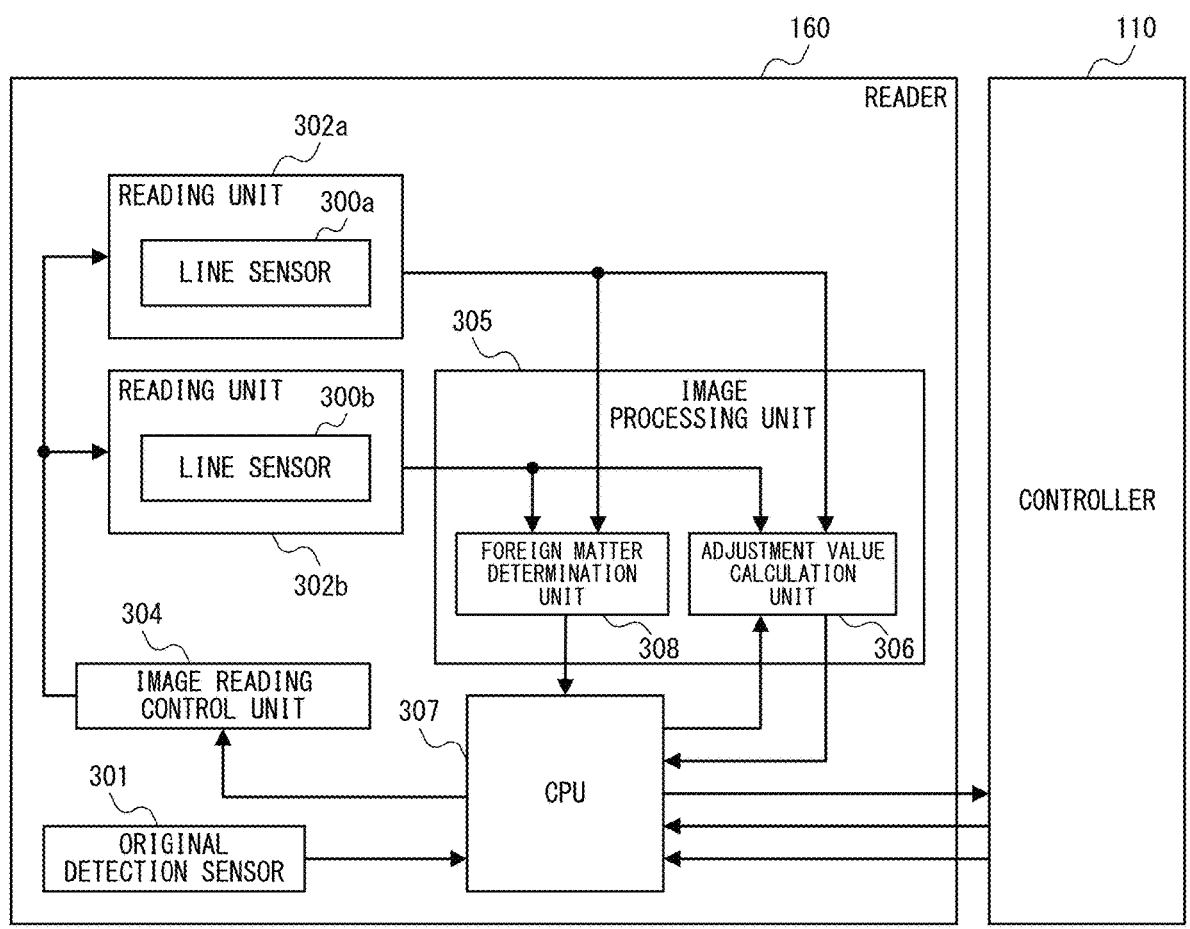

FIG. 3 is an explanatory diagram of a configuration of the reader 160. The reader 160 includes, in addition to the reading units 302a and 302b and the original detection sensor 301, an image reading control unit 304, an image processing unit 305, and a CPU 307. Operations of the reading units 302a and 302b, the image reading control unit 304, and the image processing unit 305 are controlled by CPU 307. The CPU 307 can communicate to/from the controller 110 through the system bus 116 of FIG. 1.

The reading unit 302a includes a line sensor 300a. The reading unit 302b includes a line sensor 300b. Each of the line sensors 300a and 300b is formed of, for example, a CIS, and reads an image formed on the printed material line by line. The reading units 302a and 302b are driven and controlled by the image reading control unit 304. The CPU 307 causes the image reading control unit 304 to drive the reading units 302a and 302b when a detection signal indicating that a printed material has been detected is obtained from the original detection sensor 301. When an image is read from the printed material under the control of the image reading control unit 304, each of the reading units 302a and 302b transmits read data indicating the read image to the image processing unit 305.

The image processing unit 305 includes an adjustment value calculation unit 306 and a foreign matter determination unit 308. The adjustment value calculation unit 306 calculates an image adjustment value having details instructed from the CPU 307 based on the read data obtained from the reading units 302a and 302b. For example, the adjustment value calculation unit 306 detects an image density of a test image based on the read data, derives a difference of the image density from a target image density, and calculates such an image adjustment value as to suppress the difference. When the image density is corrected, the controller 110 performs image processing on the image data based on the image adjustment value. As a result, the density of the image to be formed on a sheet based on the image data is corrected. Alternatively, for example, the adjustment value calculation unit 306 detects color misregistration of a test image based on the read data, and calculates such an image adjustment value as to suppress the color misregistration. When the color misregistration is corrected, the controller 110 performs image processing on the image data based on the image adjustment value. As a result, color misregistration of the image to be formed on the sheet based on the image data is corrected. Still alternatively, for example, the adjustment value calculation unit 306 detects a geometric characteristic (position or inclination of an image forming area) of an image to be formed on the sheet from a position at which a test image is formed based on the read data, and calculates such an image adjustment value as to suppress a difference between a target geometric characteristic and the detected geometric characteristic. When the geometric characteristic is corrected, the controller 110 performs image processing on the image data based on the image adjustment value. As a result, the position or inclination of the image to be formed on the sheet based on the image data is corrected. The adjustment value calculation unit 306 transmits the calculated image adjustment value to the CPU 307.

The foreign matter determination unit 308 determines whether dust is detected based on the read data obtained from the reading units 302a and 302b. The foreign matter determination unit 308 determines whether an image of a foreign matter (streak image generated by reading dust) is included in the read image, and when the image is included, determines a position of the foreign matter in a longitudinal direction of the line sensor 300a. The foreign matter determination unit 308 also determines whether an image of a foreign matter is included and a position of the foreign matter similarly for the line sensor 300b. The foreign matter determination unit 308 transmits foreign matter determination information indicating a determination result to the CPU 307.

The CPU 307 obtains size information indicating the size of the printed material (sheet) and image adjustment type information from the controller 110. The CPU 307 transmits, based on the image adjustment type information, an adjustment instruction for specifying the type of the image adjustment value to be calculated to the adjustment value calculation unit 306. The CPU 307 transmits the image adjustment value obtained from the adjustment value calculation unit 306 to the controller 110.

The CPU 307 obtains the foreign matter determination information from the foreign matter determination unit 308. The CPU 307 determines presence or absence of a foreign matter and a position of the foreign matter based on the foreign matter determination information, to thereby determine whether image adjustment is difficult. When the image adjustment is difficult, the CPU 307 notifies the controller 110 that the image adjustment is difficult, and transmits the foreign matter determination information to the controller 110.

The controller 110 adjusts the image forming condition based on the image adjustment value obtained from the CPU 307. When it is notified from the CPU 307 that the image adjustment is difficult, the controller 110 stops the adjustment of the image forming condition. The controller 110 displays, on the display device of the operation panel 120, that the foreign matter is detected and the position of the foreign matter based on the foreign matter determination information obtained from the CPU 307 to prompt the user to cleaning.

Figure 4:
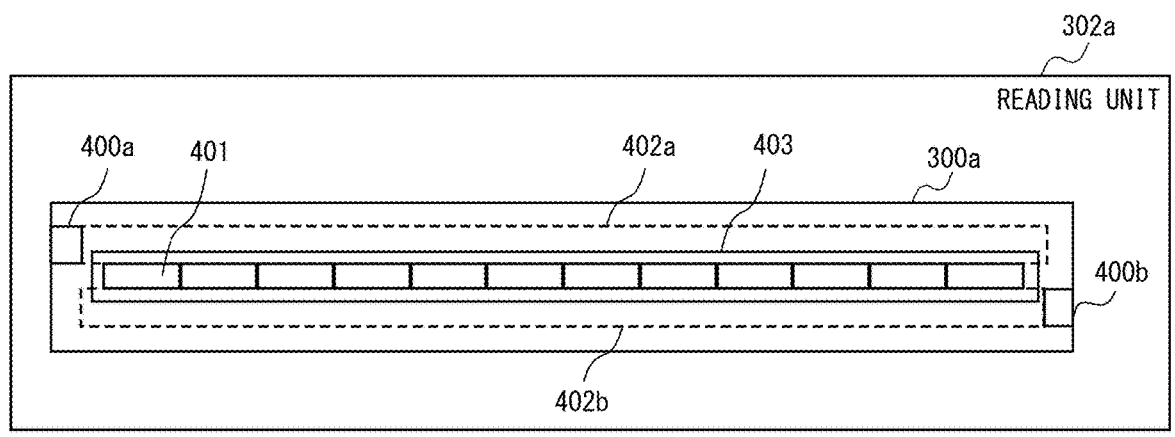

FIG. 4 is an explanatory diagram of a configuration of the reading unit 302a. The line sensor 300a of the reading unit 302a includes light emitting portions 400a and 400b, light guiding members 402a and 402b, a lens array 403, and a sensor chip group 401 formed of a plurality of sensor chips. The reading unit 302a has a rectangular parallelepiped shape, and reads an image with a longitudinal direction thereof being a main scanning direction. The line sensor 300b also has a similar configuration.

Each of the light emitting portions 400a and 400b is, for example, a light source formed of a light emitting diode (LED) that emits white light. The light guiding member 402a has the light emitting portion 400a arranged in an end portion thereof, and irradiates the printed material (sheet) with light emitted from the light emitting portion 400a. The light guiding member 402b has the light emitting portion 400b arranged at an end thereof, and irradiates the printed material (sheet) with light emitted from the light emitting portion 400b. Each of the light guiding members 402a and 402b is formed in straight line in the main scanning direction. Therefore, each of the line sensors 300 irradiate the printed material in line in the main scanning direction. The main scanning direction of the reading unit 302a and the main scanning direction of the printer 150 are the same direction.

The lens array 403 guides reflected light from the printed material of the light radiated from the light emitting portions 400a and 400b to the sensor chip group 401. The sensor chip group 401 is formed of a plurality of photoelectric conversion elements (sensor chips) arrayed in line in the main scanning direction. One sensor chip reads an image of one pixel. The plurality of sensor chips have a three-line configuration. One line is coated with a red (R) color filter, other one line is coated with a green (G) color filter, and the other one line is coated with a blue (B) color filter. The light guided by the lens array 403 forms an image on a light receiving surface of each sensor chip of the sensor chip group 401.

The light emitted from the light emitting portions 400a and 400b is diffused inside the light guiding members 402a and 402b, and is output from a portion having a curvature to illuminate the entire area in the main scanning direction of the printed material. The light guiding member 402a and the light guiding member 402b are arranged across the lens array 403 in a sub-scanning direction, which is orthogonal to the main scanning direction. Therefore, the line sensor 300a has a both-side illumination configuration in which the lens array 403 (image reading line) is irradiated with light from two directions of the sub-scanning direction. The sub-scanning direction of the reading unit 302a and the sub-scanning direction of the printer 150 are the same direction.

Figure 5:
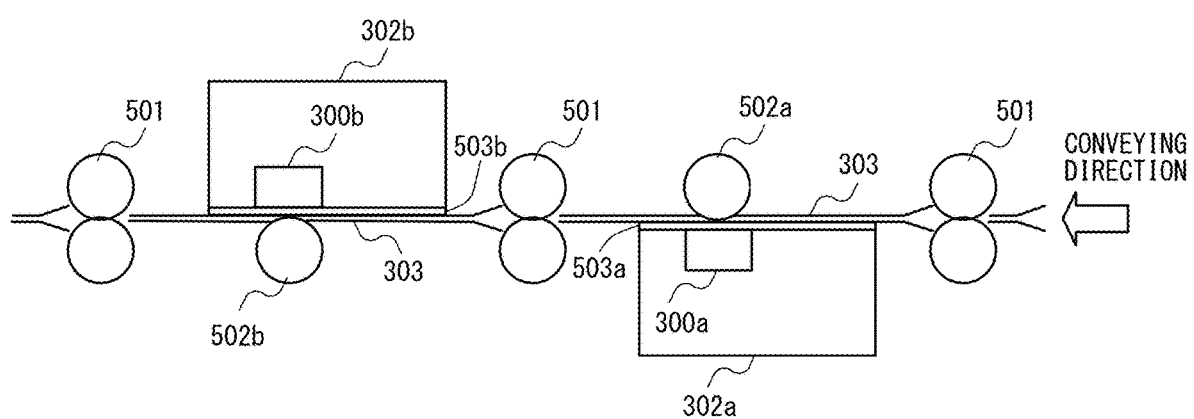

FIG. 5 is an enlarged view of a part of the reading units 302a and 302b of the reader 160. The reader 160 includes a plurality of conveying roller pairs 501 along the conveyance path 303. The printed material is conveyed along the conveyance path 303 by the plurality of conveying roller pairs 501.

A transparent contact glass 503a is arranged between the reading unit 302a and the conveyance path 303. At a position facing the contact glass 503a across the conveyance path 303, a backing roller 502a is provided. The line sensor 300a of the reading unit 302a reads an image of the printed material conveyed along the conveyance path 303 through the contact glass 503a. With the contact glass 503a, a distance between the reading unit 302a and the printed material is maintained appropriately, and the image is read with high accuracy. At that time, the backing roller 502a suppresses behavior of the sheet.

A transparent contact glass 503b is arranged between the reading unit 302b and the conveyance path 303. At a position facing the contact glass 503b across the conveyance path 303, a backing roller 502b is provided. The line sensor 300b of the reading unit 302b reads an image of the printed material conveyed along the conveyance path 303 through the contact glass 503b. With the contact glass 503b, a distance between the reading unit 302b and the printed material is maintained appropriately, and the image is read with high accuracy. At that time, the backing roller 502b suppresses the behavior of the sheet.

<Foreign Matter Determination Processing>

Figure 6:
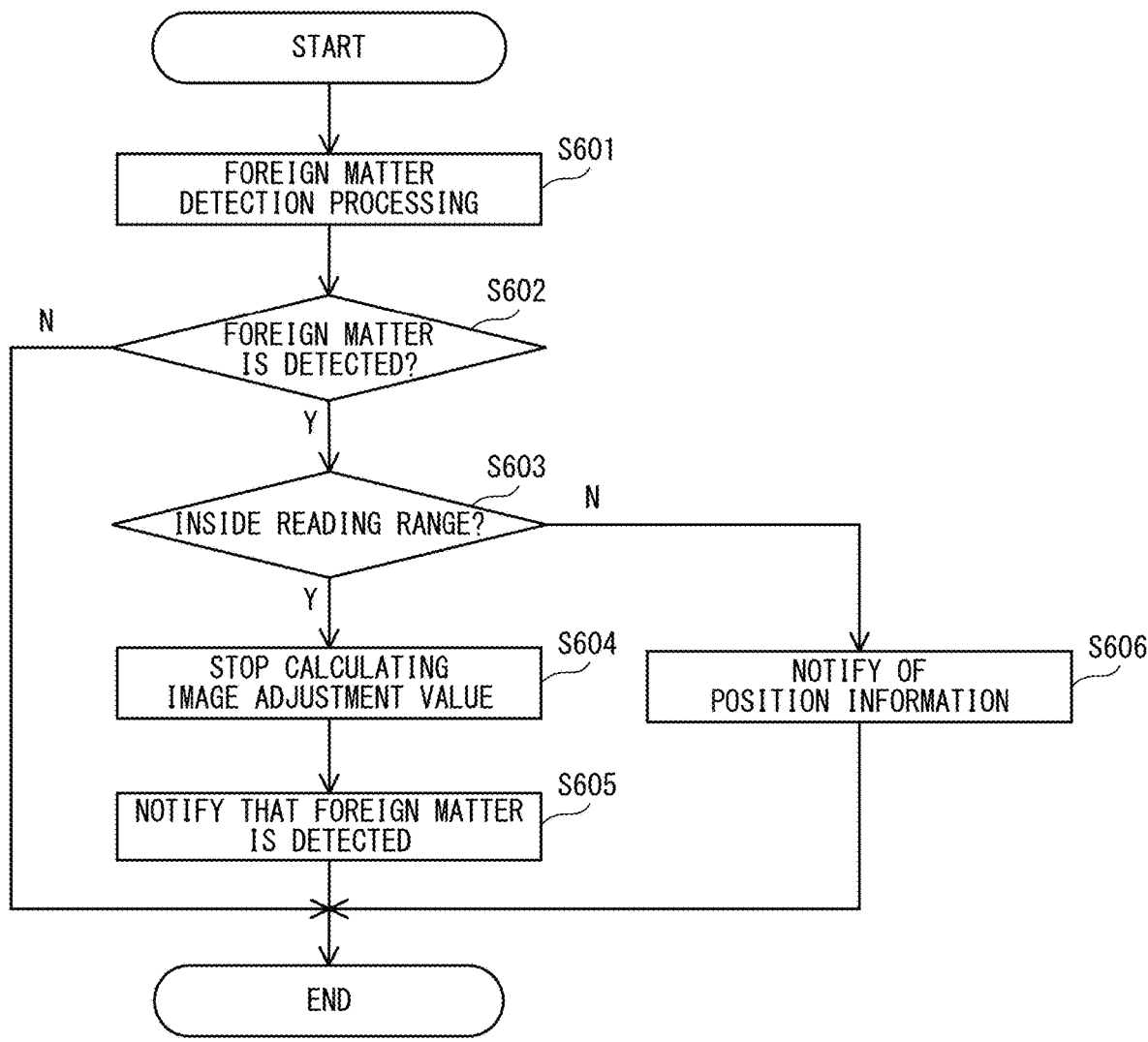

FIG. 6 is a flow chart for illustrating foreign matter determination processing in this embodiment. Foreign matters, when generated on the contact glasses 503a and 503b, are read by the reading units 302a and 302b, respectively. In a case in which the printed material is a test sheet, when the reading units 302a and 302b read the foreign matters together with the test images, images of the foreign matters are included in the reading results. This hinders correct adjustment of the image forming condition. Therefore, it is required that the determination on the presence or absence of a foreign matter be performed accurately. Here, the foreign matter determination processing using the reading unit 302a is described, but the foreign matter determination processing using the reading unit 302b is performed similarly.

The CPU 307 controls the image reading control unit 304 in accordance with an instruction from the controller 110 to read the test images from the test sheet by the reading unit 302a. The reading unit 302a transmits test image data indicating the read test images to the image processing unit 305. The CPU 307 causes the adjustment value calculation unit 306 to start processing of calculating the image adjustment value based on the read data. Further, the CPU 307 causes the foreign matter determination unit 308 to start the foreign matter determination processing.

The foreign matter determination unit 308 performs foreign matter detection processing based on the read data (Step S601). In the foreign matter detection processing, the foreign matter determination unit 308 first determines whether an image of a foreign matter is included in an image of one line read by the reading unit 302a. The foreign matter determination unit 308 thus determines the presence or absence of a foreign matter. When, as a result of the foreign matter detection processing, a foreign matter is not detected (Step S602: N), the foreign matter determination unit 308 ends the foreign matter determination processing. The foreign matter determination unit 308 notifies the CPU 307 that a foreign matter is not detected. In this case, the processing of calculating the image adjustment value by the adjustment value calculation unit 306 is continued.

When a foreign matter is detected (Step S602: Y), the foreign matter determination unit 308 determines whether a detection position of the foreign matter is inside a reading range of the test images used in currently performed adjustment of the image forming condition (Step S603). In Step S603, the foreign matter determination unit 308 determines whether a foreign matter is detected in an area (reading range) in which the line sensor 300a reads the test images in a reading area of the line sensor 300a, based on read data of a front side of the test sheet. Similarly, the foreign matter determination unit 308 determines whether a foreign matter is detected in an area (reading range) in which the line sensor 300b reads the test images in a reading area of the line sensor 300b, based on read data of a back side of the test sheet. When the detection position of the foreign matter is inside the reading range of the test images (Step S603: Y), the foreign matter determination unit 308 determines that the calculation of the image adjustment value by the adjustment value calculation unit 306 is affected. In this case, the foreign matter determination unit 308 notifies the CPU 307 that the calculation of the image adjustment value is affected. The CPU 307 stops, in response to the notification, the processing of calculating the image adjustment value by the adjustment value calculation unit 306 (Step S604). Therefore, when a foreign matter is detected at a position of the test images, the adjustment of the image forming condition based on the reading results of the test images is not performed. Further, the foreign matter determination unit 308 transmits, to the CPU 307, the foreign matter determination information indicating that a foreign matter is generated at a level that affects the calculation of the image adjustment value and position information of the foreign matter. The CPU 307 notifies the controller 110 of the detection of the foreign matter by transmitting the foreign matter determination information to the controller 110, and ends the foreign matter determination processing (Step S605).

When the detection position of the foreign matter is not inside the reading range of the test images (Step S603: N), the foreign matter determination unit 308 determines that, although the foreign matter is generated, the calculation of the image adjustment value by the adjustment value calculation unit 306 is not affected. In this case, the foreign matter determination unit 308 transmits position information of the foreign matter to the CPU 307. The CPU 307 notifies the controller 110 of the detection of the foreign matter by transmitting the position information of the foreign matter to the controller 110, and ends the foreign matter determination processing (Step S606). In this case, the processing of calculating the image adjustment value by the adjustment value calculation unit 306 is continued. In other words, the foreign matter is detected at a position different from the test images, and hence the adjustment of the image forming condition based on the reading result of the test images is performed.

When the foreign matter determination information is obtained from the CPU 307 in the processing of Step S605, the controller 110 issues a notification for prompting the user to clean out the foreign matter through the operation panel 120. In this case, the user can be notified of the position of the foreign matter based on the position information, and hence the user can clean out the foreign matter easily. Through the above-mentioned processing, the controller 110 prompts the user to clean out the foreign matter when the foreign matter affects the adjustment of the image forming condition, and does not prompt the user to clean out the foreign matter when the foreign matter does not affect the adjustment.

When the position information of the foreign matter is obtained from the CPU 307 in the processing of Step S606, the controller 110 issues a notification for prompting the user to clean out the foreign matter through the operation panel 120 after all images included in the print job are formed. In this case, the user can be notified of the position of the foreign matter based on the position information, and hence the user can clean out the foreign matter easily. The notification for the cleaning out of the foreign matter is issued after the image forming processing is finished, and hence productivity is not reduced.

Figure 7:
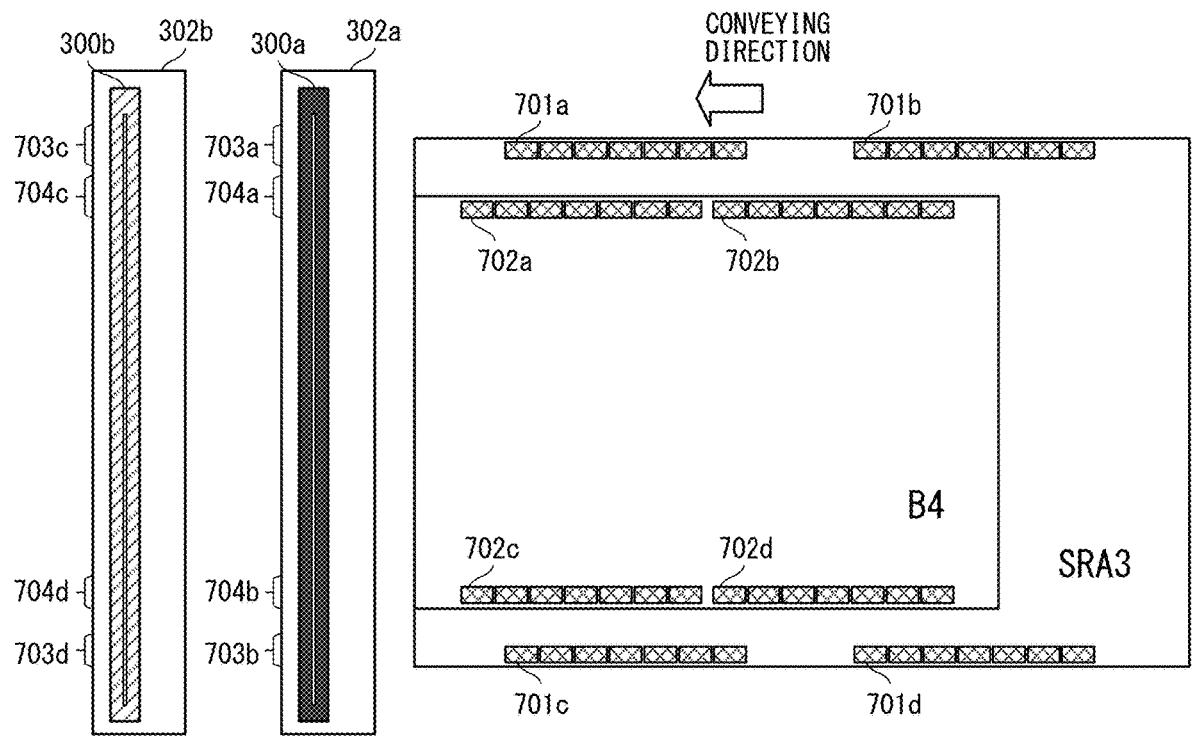

FIG. 7 is an explanatory view of foreign matter determination to be performed when image density adjustment is performed. Test images 701a to 701d and 702a to 702d for image density adjustment are formed in both end portions in a direction (main scanning direction) orthogonal to the conveying direction of the test sheet. The printing positions of the test images 701a to 701d and 702a to 702d are cut-off areas to be cut off by the finisher 190, and are different from an area of a user image printed on the sheet in accordance with the print job.

When the size of the test sheet is "SRA3 (Supplementary Raw A3)," the test images 701a, 701b, 701c, and 701d having the colors of yellow, magenta, cyan, and black are formed in cut-off areas thereof. The reading units 302a and 302b read corner portions and the test images 701a and 701b of the test sheet with a plurality of sensor chips in areas 703a and 703c of the line sensors 300a and 300b. The reading units 302a and 302b read corner portions and the test images 701c and 701d of the test sheet with a plurality of sensor chips in areas 703b and 703d of the line sensors 300a and 300b.

When a foreign matter is detected based on reading results (read data) from the sensor chips in the areas 703a, 703c, 703b, and 703d, the foreign matter determination unit 308 determines that the detection position of the foreign matter is inside the reading range of the test images in the processing of Step S603. In other words, when a foreign matter is detected based on the reading results from the sensor chips in the areas 703a, 703c, 703b, and 703d, the foreign matter determination unit 308 determines that image density adjustment is affected. In this case, the foreign matter determination unit 308 transmits, to the CPU 307, the foreign matter determination information indicating the adhesion of the foreign matter and the position of the adhering foreign matter. The position of the foreign matter is a position of the sensor chip that outputs a reading result (read data) that the foreign matter is detected.

When the size of the test sheet is "B4," the test images 702a, 702b, 702c, and 702d having the colors of yellow, magenta, cyan, and black are formed in cut-off areas thereof. The reading units 302a and 302b read corner portions and the test images 702a and 702b of the test sheet with a plurality of sensor chips in areas 704a and 704c of the line sensors 300a and 300b. The reading units 302a and 302b read corner portions and the test images 702c and 702d of the test sheet with a plurality of sensor chips in areas 704b and 704d of the line sensors 300a and 300b.

When a foreign matter is detected based on reading results (read data) from the sensor chips in the areas 704a, 704c, 704b, and 704d, the foreign matter determination unit 308 determines that the detection position of the foreign matter is inside the reading range of the test images in the processing of Step S603. In other words, when a foreign matter is detected based on the reading results from the sensor chips in the areas 704a, 704c, 704b, and 704d, the foreign matter determination unit 308 determines that image density adjustment is affected. In this case, the foreign matter determination unit 308 transmits, to the CPU 307, the foreign matter determination information indicating the adhesion of the foreign matter and the position of the adhering foreign matter. The position of the foreign matter is a position of the sensor chip that outputs a reading result (read data) that the foreign matter is detected.

Figure 8:
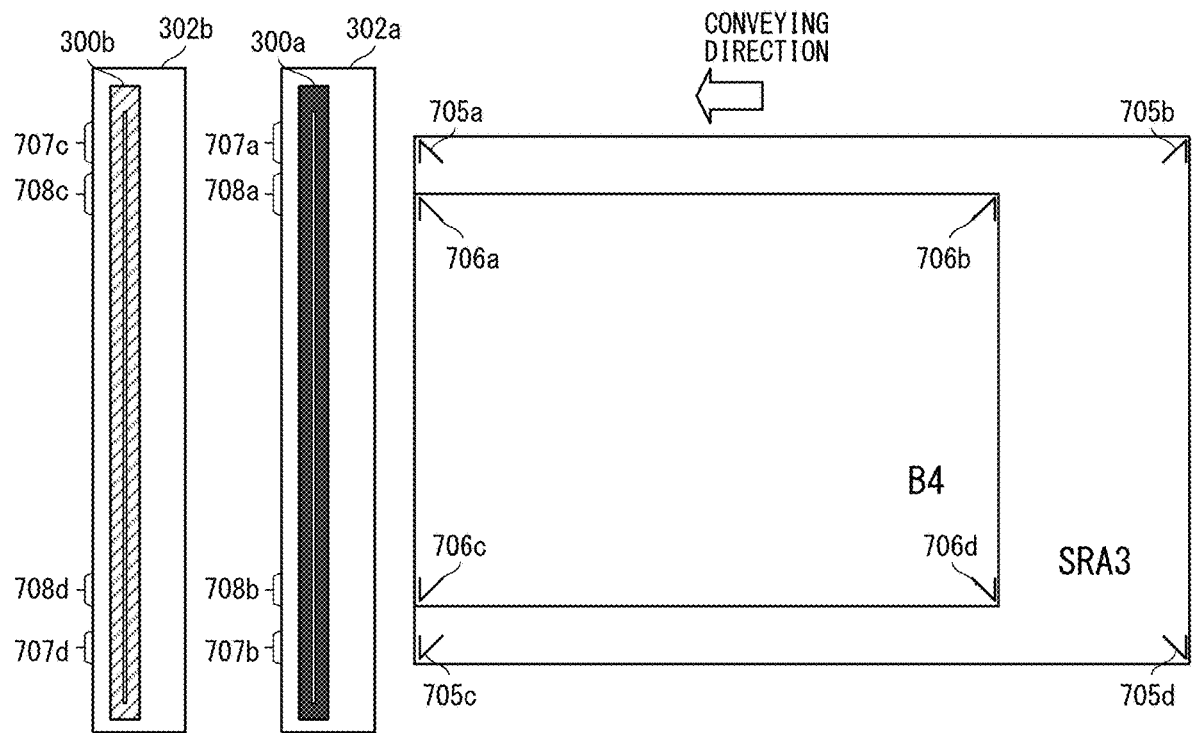

FIG. 8 is an explanatory view of foreign matter determination to be performed when color misregistration adjustment is performed. Test images 705a to 705d and 706a to 706d for color misregistration adjustment are formed in both end portions in a direction (main scanning direction) orthogonal to the conveying direction of the test sheet. The printing positions of the test images 705a to 705d and 706a to 706d are cut-off areas to be cut off by the finisher 190, and are different from an area of a user image printed on the sheet in accordance with the print job.

When the size of the test sheet is "SRA3," the test images 705a, 705b, 705c, and 705d having the colors of yellow, magenta, cyan, and black are formed in cut-off areas thereof. The reading units 302a and 302b read corner portions and the test images 705a and 705b of the test sheet with a plurality of sensor chips in areas 707a and 707c of the line sensors 300a and 300b. The reading units 302a and 302b read corner portions and the test images 705c and 705d of the test sheet with a plurality of sensor chips in areas 707b and 707d of the line sensors 300a and 300b.

When a foreign matter is detected based on reading results (read data) from the sensor chips in the areas 707a, 707c, 707b, and 707d, the foreign matter determination unit 308 determines that the detection position of the foreign matter is inside the reading range of the test images in the processing of Step S603. In other words, when a foreign matter is detected based on the reading results from the sensor chips in the areas 707a, 707c, 707b, and 707d, the foreign matter determination unit 308 determines that color misregistration adjustment is affected. In this case, the foreign matter determination unit 308 transmits, to the CPU 307, the foreign matter determination information indicating the adhesion of the foreign matter and the position of the adhering foreign matter. The position of the foreign matter is a position of the sensor chip that outputs a reading result (read data) that the foreign matter is detected.

When the size of the test sheet is "B4," the test images 706a, 706b, 706c, and 706d having the colors of yellow, magenta, cyan, and black are formed in cut-off areas thereof. The reading units 302a and 302b read corner portions and the test images 706a and 706b of the test sheet with a plurality of sensor chips in areas 708a and 708c of the line sensors 300a and 300b. The reading units 302a and 302b read corner portions and the test images 706c and 706d of the test sheet with a plurality of sensor chips in areas 708b and 708d of the line sensors 300a and 300b.

When a foreign matter is detected based on reading results (read data) from the sensor chips in the areas 708a, 708c, 708b, and 708d, the foreign matter determination unit 308 determines that the detection position of the foreign matter is inside the reading range of the test images in the processing of Step S603. In other words, when a foreign matter is detected based on the reading results from the sensor chips in the areas 708a, 708c, 708b, and 708d, the foreign matter determination unit 308 determines that color misregistration adjustment is affected. In this case, the foreign matter determination unit 308 transmits, to the CPU 307, the foreign matter determination information indicating the adhesion of the foreign matter and the position of the adhering foreign matter. The position of the foreign matter is a position of the sensor chip that outputs a reading result (read data) that the foreign matter is detected.

Figure 9:
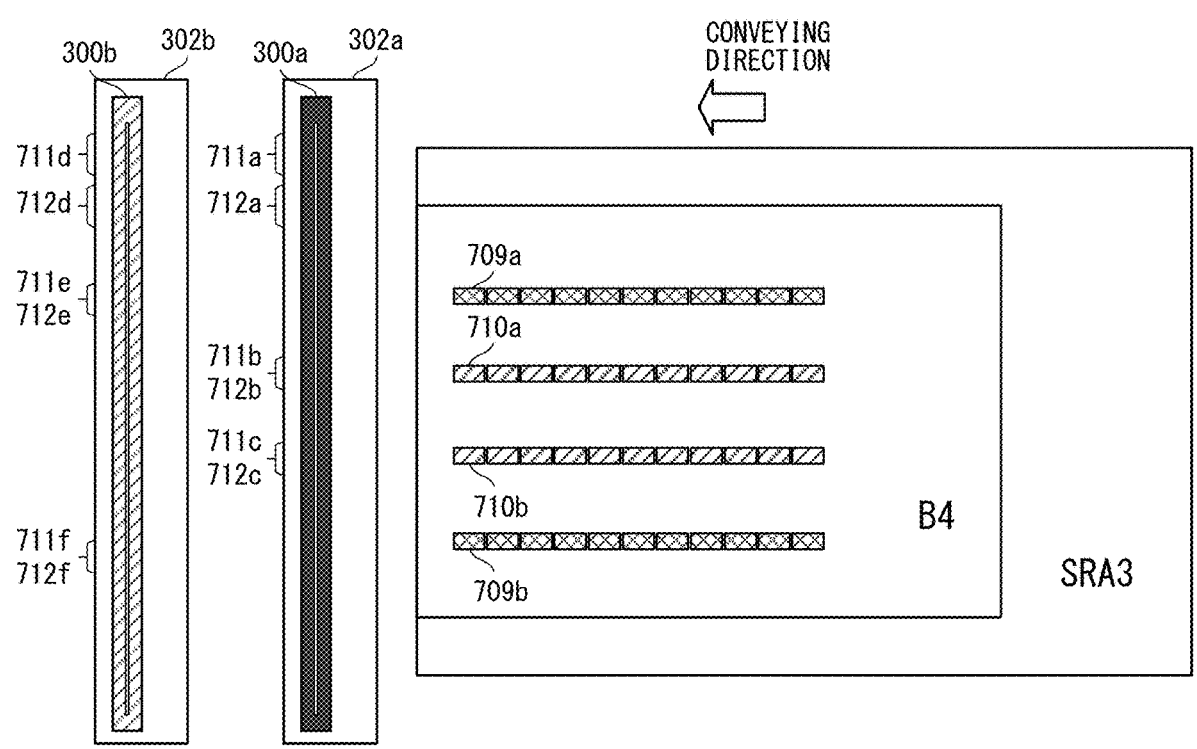

FIG. 9 is an explanatory view of foreign matter determination to be performed when a voltage of the transfer rollers 221 is adjusted. The transfer rollers 221 transfers, when a predetermined voltage is applied thereto, the toner image from the intermediate transfer belt 154 to the sheet. Here, description is given of foreign matter determination to be performed when the voltage is adjusted. When the voltage of the transfer rollers 221 is adjusted, adjustment images are printed on a sheet different from the sheet on which the user image corresponding to the print job is to be printed. In other words, the test sheet and the printed material having the user image printed thereon are generated separately. Test images 709a and 709b for voltage adjustment are formed on a first surface of the test sheet. Test images 710a and 710b for voltage adjustment are formed on a second surface, which is different from the first surface, of the test sheet.

When the test sheet is "SRA3," the test images 709a and 709b formed on the first surface are read by a plurality of sensor chips in areas 711e and 711f of the line sensor 300b of the reading unit 302b. The test images 710a and 710b formed on the second surface are read by a plurality of sensor chips in areas 711b and 711c of the line sensor 300a of the reading unit 302a. Further, end portions of the test sheet are read by a plurality of sensor chips in areas 711a and 711d of the line sensors 300a and 300b of the reading units 302a and 302b. The foreign matter determination unit 308 can determine that the test sheet is "SRA3" when the plurality of sensor chips in the areas 711a and 711d of the line sensors 300a and 300b read the end portions of the test sheet.

When a foreign matter is detected based on reading results (read data) from the sensor chips in the areas 711e, 711f, 711b, and 711c, the foreign matter determination unit 308 determines, in the processing of Step S603, that the detection position of the foreign matter is inside the reading range of the test images. In other words, when a foreign matter is detected based on the reading results from the sensor chips in the areas 711e, 711f, 711b, and 711c, the foreign matter determination unit 308 determines that the voltage adjustment of the transfer rollers 221 is affected. In this case, the foreign matter determination unit 308 transmits, to the CPU 307, the foreign matter determination information indicating the adhesion of the foreign matter and the position of the adhering foreign matter. The position of the foreign matter is a position of the sensor chip that outputs a reading result (read data) that the foreign matter is detected.

When the size of the test sheet is "B4," the test images 709a and 709b formed on the first surface are read by a plurality of sensor chips in areas 712e and 712f of the line sensor 300b of the reading unit 302b. The test images 710a and 710b formed on the second surface are read by a plurality of sensor chips in areas 712b and 712c of the line sensor 300a of the reading unit 302a. Further, end portions of the test sheet are read by a plurality of sensor chips in areas 712a and 712d of the line sensors 300a and 300b of the reading units 302a and 302b. The foreign matter determination unit 308 can determine that the size of the test sheet is "B4" when the plurality of sensor chips in the areas 712a and 712d of the line sensors 300a and 300b read the end portions of the test sheet.

When a foreign matter is detected based on reading results (read data) from the sensor chips in the areas 712e, 712f, 712b, and 712c, the foreign matter determination unit 308 determines, in the processing of Step S603, that the detection position of the foreign matter is inside the reading range of the test images. In other words, when a foreign matter is detected based on the reading results from the sensor chips in the areas 712e, 712f, 712b, and 712c, the foreign matter determination unit 308 determines that the voltage adjustment of the transfer rollers 221 is affected. In this case, the foreign matter determination unit 308 transmits, to the CPU 307, the foreign matter determination information indicating the adhesion of the foreign matter and the position of the adhering foreign matter. The position of the foreign matter is a position of the sensor chip that outputs a reading result (read data) that the foreign matter is detected.

Further, the read data used by the foreign matter determination unit 308 to detect dust is not limited to the read data on a sheet having the test images formed thereon. For example, the foreign matter determination unit 308 can determine whether dust is detected based on the read data obtained from the reading units 302a and 302b before the test images are formed. In this case, for example, read data obtained when the line sensors 300a and 300b reads a reference member may be used as the read data. With this configuration, it is possible to suppress situations in which dust is detected inside the reading range and the test sheet is printed unnecessarily.

As described above, even in a case in which a foreign matter is detected based on the reading results from the reading units 302a and 302b of the reader 160 at the time when the image forming condition is adjusted, as long as the detection position is a position that does not affect the adjustment of the image forming condition, the image forming apparatus 100 according to this embodiment does not prompt the user for cleaning. As a result, the processing of adjusting the image forming condition is continued, and the reduction in productivity and the frequency of the work of cleaning by the user can be suppressed. As described above, according to the present disclosure, the reduction in productivity and the troublesome work of cleaning by the user can be suppressed as much as possible when a foreign matter is detected.

Description has been given above of the example in which the printer 150 and the reader 160 are provided as separate devices, but the printer 150 and the reader 160 may be integrally formed. For example, the printer 150 may have a configuration in which the reading units 302a and 302b are provided on a conveyance path downstream of the first fixing device 155 and the second fixing device 156 in the conveying direction of the sheet.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-152220, filed Sep. 10, 2020, which is hereby incorporated by reference herein in its entirety.

What is claimed is:

1. An image forming apparatus comprising:
   an image forming unit configured to form an image on a sheet;
   a line sensor configured to read a sheet having test images formed thereon while the sheet having the test images formed thereon is conveyed; and
   a controller configured to:
      control the image forming unit to form the test images on the sheet;
      control the line sensor to read the sheet having the test images formed thereon;
      obtain read data related to the test images, the read data being output by the line sensor; and
      control, based on the read data, a geometric characteristic of an image to be formed on a sheet by the image forming unit,
   wherein the controller is configured to determine, in a reading area of the line sensor, whether dust is detected in a first area in which the line sensor reads the test images based on a reading result from the line sensor,
   wherein, in a case where dust is detected in a second area, which is different from the first area, in the reading area, the controller is configured to control the geometric characteristic based on the read data, and
   wherein, in a case where dust is detected in the first area, the controller is configured to not control the geometric characteristic based on the read data.

2. The image forming apparatus according to claim 1,
   wherein the line sensor is configured to read, through a light transmitting member, the sheet having the test images formed thereon,
   wherein the controller is configured to output a signal for prompting cleaning of the light transmitting member, and
   wherein, in a case where dust is detected in the first area, the controller is configured to output the signal without controlling the geometric characteristic based on the read data.

3. The image forming apparatus according to claim 1,
   wherein the line sensor is configured to read, through a light transmitting member, the sheet having the test images formed thereon,
   wherein the controller is configured to output a signal for prompting for cleaning of the light transmitting member,
   wherein, in a case where dust is detected in the first area, the controller is configured to output the signal without generating an adjustment value for adjusting the geometric characteristic based on the read data, and
   wherein, in a case where dust is detected in the second area, the controller is configured to output the signal after generating the adjustment value based on the read data.

4. The image forming apparatus according to claim 1, wherein the test images are formed in corner areas of the sheet.

5. The image forming apparatus according to claim 1,
   wherein the image forming apparatus further comprises a tray on which the sheet having the image formed thereon by the image forming unit is to be discharged, and
   wherein the line sensor is provided on a conveyance path along which the sheet is conveyed to the tray.

6. The image forming apparatus according to claim 1, wherein the controller is configured to output information on a position of the dust based on the reading result from the line sensor.

7. An image forming apparatus comprising:
   an image forming unit configured to form an image on a sheet based on an image forming condition for adjusting an image density;
   a line sensor configured to read a sheet having test images formed thereon while the sheet having the test images formed thereon is conveyed; and
   a controller configured to:
      control the image forming unit to form the test images on the sheet;
      control the line sensor to read the sheet having the test images formed thereon;
      obtain read data related to the test images, the read data being output by the line sensor; and
      generate the image forming condition based on the read data,
   wherein the controller is configured to determine, in a reading area of the line sensor, whether dust is detected in a first area in which the line sensor reads the test images based on a reading result from the line sensor,
   wherein, in a case where dust is detected in a second area, which is different from the first area, in the reading area, the controller is configured to generate the image forming condition based on the read data, and
   wherein, in a case where dust is detected in the first area, the controller is configured to not generate the image forming condition based on the read data.

8. The image forming apparatus according to claim 7,
   wherein the line sensor is configured to read, through a light transmitting member, the sheet having the test images formed thereon,
   wherein the controller is configured to output a signal for prompting for cleaning of the light transmitting member, and
   wherein, in a case where dust is detected in the first area, the controller is configured to output the signal without generating the image forming condition based on the read data.

9. The image forming apparatus according to claim 7,
   wherein the line sensor is configured to read, through a light transmitting member, the sheet having the test images formed thereon,
   wherein the controller is configured to output a signal for prompting for cleaning of the light transmitting member,
   wherein, in a case where dust is detected in the first area, the controller is configured to output the signal without generating the image forming condition based on the read data, and
   wherein, in a case where dust is detected in the second area, the controller is configured to output the signal after the image forming condition is generated based on the read data.

10. The image forming apparatus according to claim 7,
    wherein the image forming apparatus further comprises a tray on which the sheet having the image formed thereon by the image forming unit is to be discharged, and
    wherein the line sensor is provided on a conveyance path along which the sheet is conveyed to the tray.

11. The image forming apparatus according to claim 7, wherein the controller is configured to output information on a position of the dust based on the reading result from the line sensor.

12. An image forming apparatus comprising:
an image forming unit configured to form an image on a sheet based on an image forming condition for adjusting an image density;
a line sensor configured to read a sheet having test images formed thereon while the sheet having the test images formed thereon is conveyed; and
a controller configured to:
control the image forming unit to form the test images on the sheet;
control the line sensor to read the sheet having the test images formed thereon;
obtain read data related to the test images, the read data being output by the line sensor; and
generate the image forming condition based on the read data,
wherein the controller is configured to determine, in a reading area of the line sensor, whether dust is detected in a first area in which the line sensor reads the test images based on a reading result from the line sensor,
wherein, in a case where dust is detected in a second area, which is different from the first area, in the reading area, the image forming unit is controlled based on the image forming condition generated based on the read data, and
wherein, in a case where dust is detected in the first area, the image forming unit is not controlled based on the image forming condition generated based on the read data.

13. The image forming apparatus according to claim 12,
wherein the line sensor is configured to read, through a light transmitting member, the sheet having the test images formed thereon,
wherein the controller is configured to output a signal for prompting for cleaning of the light transmitting member, and
wherein, when dust is detected in the first area, the controller is configured to output the signal without generating the image forming condition based on the read data.

14. The image forming apparatus according to claim 12,
wherein the line sensor is configured to read, through a light transmitting member, the sheet having the test images formed thereon,
wherein the controller is configured to output a signal for prompting for cleaning of the light transmitting member,
wherein, when dust is detected in the first area, the controller is configured to output the signal without generating the image forming condition based on the read data, and
wherein, when dust is detected in the second area, the controller is configured to output the signal after the image forming condition is generated based on the read data.

15. The image forming apparatus according to claim 12,
wherein the image forming apparatus further comprises a tray on which the sheet having the image formed thereon by the image forming unit is to be discharged, and
wherein the line sensor is provided on a conveyance path along which the sheet is conveyed to the tray.

16. The image forming apparatus according to claim 12, wherein the controller is configured to output information on a position of the dust based on the reading result from the line sensor.

* * * * *